No. 685,278. Patented Oct. 29, 1901.
G. HEIDEL.
BATTERY.
(Application filed Aug. 20, 1900.)
(No Model.)
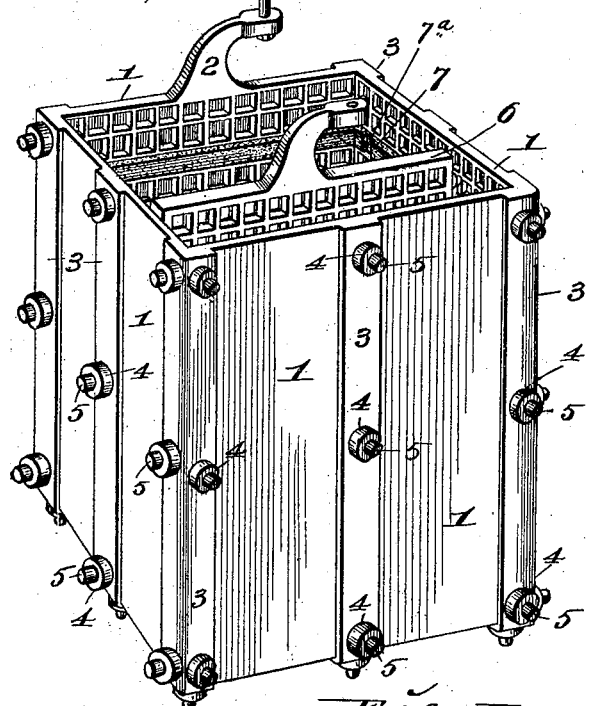
Fig. I.
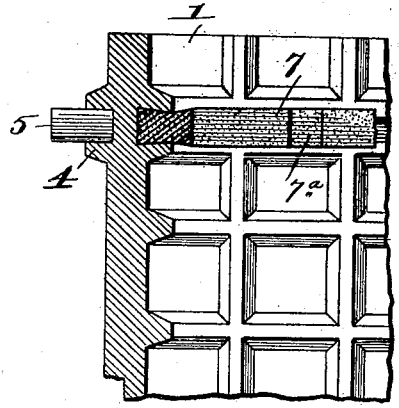
Fig. III.
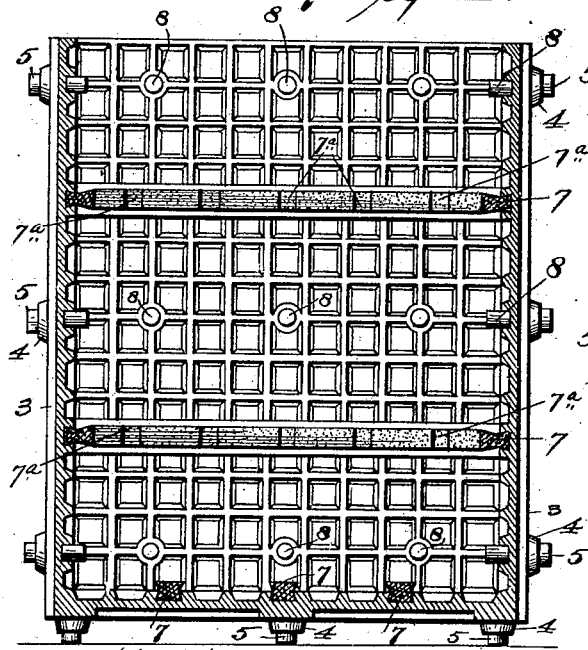
Fig. II.
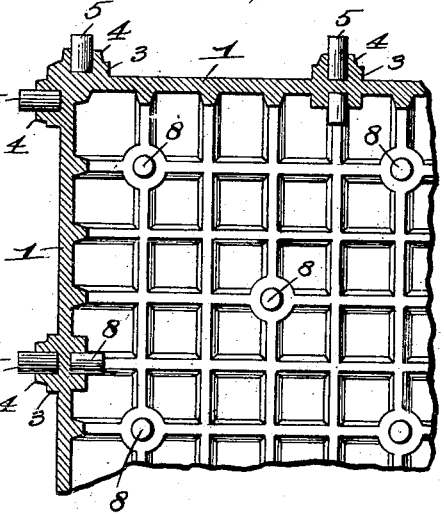
Fig. IV.
Attest:
M. P. Smith
E. S. Knight
Inventor:
Gustavos Heidel
By Wright Bro
atty's.

UNITED STATES PATENT OFFICE.

GUSTAVOS HEIDEL, OF ST. LOUIS, MISSOURI, ASSIGNOR OF ONE-HALF TO GUSTAV MILLER, OF ST. LOUIS, MISSOURI.

BATTERY.

SPECIFICATION forming part of Letters Patent No. 685,278, dated October 29, 1901.

Application filed August 20, 1900. Serial No. 27,368. (No model.)

*To all whom it may concern:*

Be it known that I, GUSTAVOS HEIDEL, a citizen of the United States, residing in the city of St. Louis, in the State of Missouri, have invented certain new and useful Improvements in Batteries, of which the following is a full, clear, and exact description, reference being had to the accompanying drawings, forming part of this specification.

My invention relates to an improvement in batteries; and, briefly stated, it consists in a construction wherein one element of the battery is formed by the cell thereof and the other element is formed by an electrode of suitable construction located in the cell with the chemical solution, which acts upon the materials of the cell and electrode in the same manner as such chemicals act upon two electrodes where, as is commonly the case, the cell is of non-active material.

The objects of my invention are manifold and comprise reduction in the size of batteries, reduction in weight, decrease in number of parts, and consequent reduction in cost of manufacture and decrease in number of parts necessary to be handled in manipulating the battery. These features are of essential importance, more particularly in storage batteries, especially those used upon motor-vehicles, where economy in space and weight of batteries is material.

My invention consists in features of novelty hereinafter fully described, and pointed out in the claims.

Figure I is a perspective view illustrating my improved battery. Fig. II is a vertical sectional view of the battery-cell. Fig. III is an enlarged detail view, partly in section, of a fragment of the cell. Fig. IV is a view, partly in cross-section, of a fragment of the cell, showing a modification.

The cell of the battery is composed of electro-active material of any suitable description, such as zinc, lead, and carbon or others that the electrodes of batteries are usually made of. The cell is provided with a binding-post connection 2, adapted to receive one of the terminal wires. For the purpose of insulating the cell at its exterior from surrounding objects into which the electric current may be discharged I provide ribs 3, located at intervals about the exterior of the cell at sides and bottom, and form recessed bosses 4 upon these ribs, into which are inserted insulator-plugs 5. The plugs 5 may be of rubber, wood, cork, or any other suitable non-conductor of electricity.

6 designates an electrode of suitable construction and design arranged within the cell 1. I have shown but one electrode; but it is obvious that any greater number may be employed in the same cell, and in practice a greater number would usually be employed.

It is obvious that for the practical operation of the battery it is necessary that the electrodes contained in the cell must be insulated from such cell. To provide for such insulation, I place insulator-strips 7 within the cell, suitably maintained in the wall thereof. These strips may be of any suitable material—such as rubber, wood, or cork—and they are preferably provided with grooves $7^a$, into which the electrodes 6 are inserted to maintain them in upright position and prevent them from falling into contact with each other.

In some instances I may utilize insulator-plugs 8 on the interior of the cell 1 in addition to the strips 7, as seen in Fig. II, and in some instances the strips 7 may be dispensed with and the plugs 8 be used entirely in lieu thereof, as illustrated in the modification shown in Fig. IV. The interior of the cell-walls is preferably of cellular formation, as shown, in order to expose a maximum of surface for the action of the chemicals upon the electro-active material of the cell.

I claim as my invention—

1. As a new article of manufacture a battery-cell of conductive material provided with insulators projecting at intervals from the exterior of the cell, substantially as and for the purpose stated.

2. A battery comprising a cell of electro-active material forming one active element thereof, an electrode located in said cell and forming the other active element, and insulators arranged upon the exterior of said cell, and projecting at intervals therefrom, substantially as described.

3. In a battery, the combination of a cell of electro-active material, an electrode arranged in said cell, means for insulating said electrode from said cell, and insulators located upon the exterior of said cell and projecting at intervals therefrom, substantially as described.

4. In a battery, the combination of a cell composed of electro-active material, an electrode arranged in said cell, means for insulating said electrode from said cell, ribs arranged on the exterior of said cell, recessed bosses on said ribs, and insulator-plugs in said bosses, substantially as described.

GUSTAVOS HEIDEL.

In presence of—
 E. S. KNIGHT,
 M. P. SMITH.